March 17, 1925.  1,530,128
L. A. LAURSEN
PROCESS OF AND APPARATUS FOR MAKING RUBBER TUBES WITH TAPERED ENDS
Filed March 5, 1924
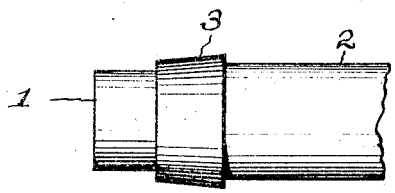
*Fig. 1.*
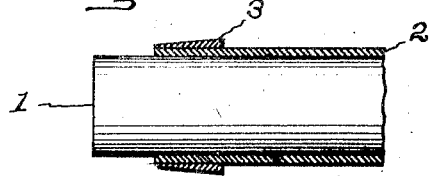
*Fig. 2.*
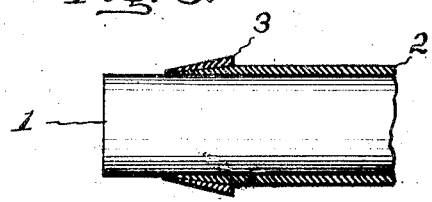
*Fig. 3.*
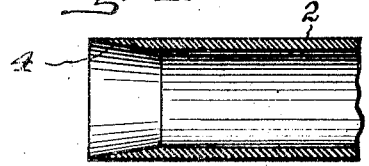
*Fig. 4.*
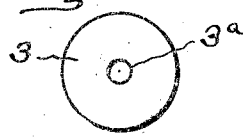
*Fig. 5.* *Fig. 7.* *Fig. 8.*
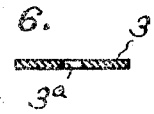
*Fig. 6.*
INVENTOR.
BY L. A. Laursen
Robb Robb Hill
ATTORNEYS Patented Mar. 17, 1925.

1,530,128

UNITED STATES PATENT OFFICE.

LAURITS A. LAURSEN, OF EAU CLAIRE, WISCONSIN.

PROCESS OF AND APPARATUS FOR MAKING RUBBER TUBES WITH TAPERED ENDS.

Application filed March 5, 1924. Serial No. 696,930.

*To all whom it may concern:*

Be it known that I, LAURITS A. LAURSEN, a citizen of the United States, residing at Eau Claire, in the county of Eau Claire and State of Wisconsin, have invented certain new and useful Improvements in Processes of and Apparatus for Making Rubber Tubes with Tapered Ends, of which the following is a specification.

The present invention relates to a process of and apparatus for making rubber tubes with tapered ends, and the object of the invention is to provide a simple, effective and inexpensive means whereby the end of a rubber tube may be given a tapered form during the process of manufacture.

The rubber tubes which are used in making pneumatic tires are ordinarily formed upon a straight pole or mandrel, the ends of the tube being cemented or vulcanized together after the tube has been stripped from the mandrel. In order to provide a smooth surface for the tube at the place where the ends are joined together one or both of the ends of the tube is customarily skived or tapered. At the present time the skiving or tapering of the ends of the tube is usually done by a knife and not only is the operation rather expensive, but the results obtained are far from perfect, owing to the fact that it is difficult to obtain a smooth cut in soft rubber with a knife.

According to the present invention the end of the tube is given a tapered formation during the period of vulcanization. This avoids the necessity of subsequently skiving the end of the tube with a knife and the taper is formed upon the tube in a uniform and satisfactory manner.

With the foregoing and other objects in view the invention consists in a certain process of making the tubes together with a suitable apparatus for use in carrying on the process.

For a full understanding of the invention reference is to be had to the following description and accompanying drawings, in which, Figure 1 is a side elevation of one end of a mandrel with a tube fastened thereon in accordance with the invention, the parts being shown as they appear before vulcanization.

Figure 2 is a similar view with the rubber tube and constrictive ring shown in section.

Figure 3 is a view similar to Figure 2, showing the change which takes place during the process of vulcanization.

Figure 4 is a sectional view through one end of a tube which has been formed in accordance with the invention, said tube having been turned inside out as it was stripped from the mandrel.

Figure 5 is a plan view of the constrictive band before it is applied to the mandrel.

Figure 6 is a transverse sectional view through the same.

Figure 7 is a sectional view through the constrictive band, showing the same as partially stretched preparatory to being applied to the mandrel.

Figure 8 is a similar view showing the constrictive band when stretched and applied to the mandrel, a portion of the mandrel being indicated by dotted lines.

Corresponding and like parts are referred to in the following description and indicated on all of the views of the drawing by like reference characters.

Referring to the drawings, the reference numeral 1 designates a mandrel or pole upon which the rubber tube 2 is supported during the period of vulcanization. The mandrel 1 may be of any suitable or conventional construction and the uncured rubber from which the tube is to be made may be rolled upon or otherwise applied to the mandrel in any customary or suitable manner. After the uncured rubber is applied to the mandrel the rubber is frequently wrapped with fabric strips so that it is pressed tightly against the mandrel and held in close engagement therewith during the period of vulcanization. Other means, such as fluid pressure may be utilized instead of the fabric wrapping to hold the uncured rubber closely against the mandrel. During the period of vulcanization the rubber first becomes soft and plastic so that it will readily assume any shape, and the rubber is held in a close engagement with the mandrel so that the portion of the rubber in contact with the mandrel will be perfectly smooth and free from blemishes. When the tube is stripped from the mandrel it is turned inside out, so that the smooth side of the tube is on the outside and is the side seen by the customer when he purchases the tube.

According to the present invention a constrictive ring or band 3 is applied to the end of the uncured rubber, after it has been applied to the mandrel. This constrictive ring 3 has a width corresponding approximately to the length of the taper which it is desired to form upon the end of the tube and the constrictive pressure of the ring against the tube increases gradually from one end of the ring to the opposite end thereof. The end of the ring which exerts the greatest constrictive pressure is in engagement with the extremity of the uncured rubber tube, while the other end of the constrictive ring is remote from the end of the mandrel and toward the middle portion of the rubber tube. The latter end of the constrictive ring exerts little or no pressure against the rubber. The ring is applied to the mandrel and tube prior to the curing or vulcanizing of the rubber, and the manner in which the ring then engages the rubber tube is indicated by Figure 2 of the drawing.

During the period of vulcanization the rubber of the tube 2 becomes softened and plastic with the result that the portions thereof which are subjected to the graduated constrictive pressure in the different annular zones of the constrictive ring are shaped or molded to provide a beveled or skived end on the tube, as indicated by Figure 3. The outer end of the constrictive ring 3 exerts the maximum constrictive pressure against the rubber and contracts into substantial engagement with the mandrel when the rubber of the tube 2 is softened during vulcanization. The other end of the constrictive ring exerts practically no pressure upon the rubber and the constrictive pressure is graduated so that it increases gradually from the inner end of the constrictive ring to the outer end thereof with the result that when the rubber is softened during the period of vulcanization the end of the tube is shaped or molded to provide a beveled end.

After the tube has been properly vulcanized in the usual manner the constrictive ring 3 is removed and the tube stripped from the mandrel. During the stripping operation the tube is usually turned inside out so that the finished tube will have a beveled end, such as that indicated at 4 on Figure 4.

The constrictive ring or band 3 may be formed in any suitable manner and constructed of any suitable material, although one effective form of ring is illustrated by Figures 5 and 6. The ring 3 is normally flat and can be inexpensively stamped or cut from sheet rubber such as that found in old tire tubes. The central opening 3ª of the ring is comparatively small, and the outer diameter of the ring is substantially the same as the outer diameter of the mandrel. Figure 7 illustrates the ring when in a partially stretched condition, preparatory to applying it to the mandrel, and it will be observed that as the ring is stretched the rubber at the periphery of the central opening 3ª is placed under a maximum degree of tension and this tension gradually increases toward the outer diameter of the ring. When the ring is fully stretched and applied to the mandrel, as indicated by Figure 8, the periphery of the opening 3ª is enlarged to the same size as the outer circumference of the ring, although the rubber at the periphery of the opening 3ª is under a very considerable amount of tension, while the rubber at the outer periphery of the ring is under practically no tension.

In the manufacture of the rubber tubes one of the constrictive rings 3 may be applied to either or both ends of the tube, according to whether or not it is desired to impart a bevel to one or both ends of the tube. The graduated pressure of the constrictive ring will act upon the rubber of the tube 2 as soon as the rubber is softened by the heat to mold the rubber at the ends of the tube and produce the desired beveled formation. The tube thus has one or both ends beveled when it is stripped from the mandrel, and the time and expense involved in subjecting the tube to an additional cutting operation for the purpose of skiving the ends thereof is saved. Not only is it a saving in time and expense but a smoother and more satisfactory beveled end is provided, for the reason that it is practically impossible to obtain a smooth and uniform cut upon soft rubber with a knife. Where the ends of the tube are beveled in this way they can be cemented or vulcanized together in the customary manner and a smooth surface obtained at the joint.

While I have disclosed one specific method of performing the steps of the process and illustrated a preferred apparatus for use in making the tubes, it will be understood that I do not restrict myself to the precise details disclosed in this application, since many modifications and changes are possible without departing from the spirit of the invention.

Having thus described my invention what I claim as new and desire to secure by Letters Patent, is—

1. In combination, a mandrel over which a tube may be placed, and means for applying a graduated constrictive pressure to an end portion of the tube, and maintaining such pressure under vulcanizing temperature.

2. In combination, a mandrel over which a tube may be placed, and a constrictive ring having inherent constrictive pressure for engaging the tube member, said ring bearing upon the tube with a graduated pressure in different zones thereof.

3. In combination, a mandrel over which a tube may be placed, and a resilient constrictive ring in which the degree of constriction pressure varies at different points in the length thereof, said ring being adapted to be applied to the tube while it is on the mandrel.

4. In combination, a mandrel over which a tube may be placed, and a constrictive ring having inherent constriction action which increases gradually from one end thereof to the opposite end, said ring being adapted to be applied to an end of the tube while it is on the mandrel.

5. An elastic constrictive ring having a length corresponding to that of a taper which it is desired to form upon the end of the tube, the degree of constriction increasing gradually from one end of the ring to the opposite end thereof and the ring being adapted to be applied to the end of the tube whereby the said end of the tube will be molded into a tapered form during the period of vulcanization.

6. In combination, a mandrel over which a tube of uncured rubber may be placed, and an elastic ring adapted to be applied to the end of the tube and having different diameters at the ends thereof so that one end of the ring will be under a greater tension than the other end of the ring when the ring is expanded and applied to the mandrel and tube, thereby causing a graduated pressure to be exerted upon the end portion of the tube so that the said end of the tube will be given a tapered form during the period of vulcanization.

7. In combination, a mandrel over which a tube of uncured rubber may be placed, and a constrictive ring formed of a flat sheet of elastic material having a comparatively small central opening and an outer diameter corresponding to the outer diameter of the mandrel, whereby the different annular zones of the elastic material will be under different degrees of tension when the ring is expanded and applied to the mandrel and tube, and the said constrictive tension will gradually increase from one end of the ring to the opposite end, so that the end of the tube will be molded into a tapered form during the period of vulcanization.

8. The process of making a rubber tube with a tapered end which consists of applying a graduated pressure to the end of the tube and maintaining said pressure during the period of vulcanization, whereby the end will be molded into a tapered form.

9. The process of making a rubber tube with a tapered end which consists in placing an uncured rubber tube on a mandrel and applying a constrictive ring to the end of the tube, said ring exerting a constrictive pressure which increases gradually from one end thereof to the opposite end and the ring being maintained in position during the period of vulcanization, whereby the end of the tube will be given a tapered form while it is softened.

10. In a tire making apparatus in combination, a mandrel over which an uncured tube may be placed, a resilient mold member for forming an end portion of the tube with a tapered longitudinal cross-section for a short distance from the adjacent extremity, the mold member and mandrel being so related that the mold member may be maintained in active relation to the tube during the period of vulcanization of the latter to give permanent tapered form to the tube end aforesaid.

11. As a new article of manufacture, a rubber tube end tapering appliance comprising a ring composed of a flat elastic body having a central opening, said ring adapted to be expanded to fit over and bear on the end of a rubber tube.

12. As a new article of manufacture, a rubber tube end tapering appliance comprising a ring composed of a flat elastic body having a central opening, said ring adapted to be expanded to fit over and bear on the end of a rubber tube, the opening being much smaller than the ring body so that it will act with pressure on the tube end which pressure is graduated from the opening to the outermost portion of the ring.

13. As a new article of manufacture, a rubber tube end tapering appliance composed of a round flat rubber ring having a relatively small central opening.

In testimony whereof I affix my signature.

LAURITS A. LAURSEN.